(12) United States Patent
Zeitfuss

(10) Patent No.: US 6,842,439 B2
(45) Date of Patent: Jan. 11, 2005

(54) FREE SPACE OPTICAL TERMINAL WITH AD HOC NETWORK BACK-UP AND ASSOCIATED METHODS

(75) Inventor: Michael P. Zeitfuss, Satellite Beach, FL (US)

(73) Assignee: Harris Corporation, Melbourne, FL (US)

( * ) Notice: Subject to any disclaimer, the term of this patent is extended or adjusted under 35 U.S.C. 154(b) by 301 days.

(21) Appl. No.: 10/173,481

(22) Filed: Jun. 17, 2002

(65) Prior Publication Data

US 2003/0231584 A1 Dec. 18, 2003

(51) Int. Cl.$^7$ ................................................ H04Q 7/00
(52) U.S. Cl. .................... 370/328; 370/277; 398/118; 398/124; 398/116
(58) Field of Search ................................ 370/254, 256, 370/257, 258, 338, 328, 349, 351–359, 395.21, 277, 400; 398/118, 123, 124, 115, 116

(56) References Cited

U.S. PATENT DOCUMENTS

| | | | |
|---|---|---|---|
| 5,229,593 A | * 7/1993 | Cato | 250/205 |
| 5,786,923 A | 7/1998 | Doucet et al. | 359/172 |
| 5,886,923 A | * 3/1999 | Hung | 365/185.11 |
| 5,987,011 A | 11/1999 | Toh | 370/331 |
| 5,995,593 A | * 11/1999 | Cho | 379/56.3 |
| 6,122,759 A | 9/2000 | Ayanoglu et al. | 714/57 |
| 6,285,857 B1 | 9/2001 | Javitt | 455/15 |
| 6,304,556 B1 | * 10/2001 | Haas | 370/254 |
| 6,397,248 B1 | * 5/2002 | Iyer | 709/223 |
| 6,414,774 B1 | * 7/2002 | Scifres | 398/129 |
| 6,556,565 B1 | * 4/2003 | Ward et al. | 370/356 |
| 6,559,993 B2 | * 5/2003 | Doucet et al. | 398/126 |
| 6,626,587 B1 | * 9/2003 | Marmur | 398/17 |
| 6,643,466 B1 | * 11/2003 | Helms et al. | 398/120 |
| 6,678,477 B1 | * 1/2004 | Matsuda et al. | 398/136 |
| 6,701,092 B2 | * 3/2004 | Doucet et al. | 398/128 |

OTHER PUBLICATIONS

*fSONA Makes First Eye–Safe Optical Wireless Products Commercially Available*, Business Wire, Feb. 26, 2001, pp. 1–2.

Lightpointe, *Free–space Optical Networking Equipment Overcomes Geographic Challenges*, available at www.lightpointe.com, pp. 1–2, (date unknown).

Furtera, *Optical LAN Access*, available at www.furtera.com, pp. 1–2, (date unknown).

Greene, *Optical Access Links Buildings With Lasers*, Network World, Sep. 25, 2000, available at www.nwfusion.com, pp.1–2.

Tschudin, *Data Networks II(1999–2000), Ad–hoc Networks*, Department of Computer Systems, Uppsala University, Apr. 7, 2000.

Chakrabarti et al., "QoS Issues in Ad Hoc Wireless Networks", IEEE Communications Magazine, (Feb. 2001), pp. 142–148.

Chen, "Routing Support for Providing Guaranteed End–to–End Quality–of–Service," Ph.D. thesis, Univ. of Illinois at Urbana–Champaign, http://cairo.cs.uiuc.edu/papers/Scthesis.ps. 1999.

* cited by examiner

Primary Examiner—Douglas Olms
Assistant Examiner—Van Nguyen
(74) Attorney, Agent, or Firm—Allen, Dyer, Doppelt, Milbrath & Gilchrist, P.A.

(57) ABSTRACT

A communication system includes a pair free space optical (FSO) terminals. The FSO terminals switch from a first operating mode to a second operating mode wherein the traffic is carried by an ad hoc network. The switching may be based upon a quality of service (QoS) parameter being exceeded. The first operating mode may be the primary operating mode, and the second operating mode may be the back-up operating mode.

38 Claims, 3 Drawing Sheets

FREE SPACE OPTICAL TERMINAL WITH AD HOC NETWORK BACK-UP AND ASSOCIATED METHODS

FIELD OF THE INVENTION

The present invention relates to the field of communications systems, and, more particularly, to free space optical communications systems and related methods of carrying communications.

BACKGROUND OF THE INVENTION

Free space optical (FSO) communications systems are wireless point-to-point communications systems that use lasers to transmit and receive communication signals via line-of-sight directed laser beams. Because the beams are directed and narrow, FSO communications systems are generally thought to be secure and reliable. The beams can be sufficiently low-powered to reduce a risk of eye injuries. An FSO system that switches power levels is disclosed in U.S. Pat. No. 5,229,593, for example.

FSO communications systems have proved to be especially advantageous in campus environments. For example, a business organization may wish to construct a local area network (LAN) linking employees located in different nearby buildings. If the organization were to rely on installing private dedicated lines using, for example, fiber optic cable, it would incur considerable expense in terms of construction costs for installing the cables, as well as the inevitable delay in establishing the LAN until construction could be completed. The costs and delay would likely be even greater were the campus located within an urban setting, where even linking employees in buildings located just across the street from one another can require extensive regulatory approvals and expensive disruptions to local activity. Such delays and/or disruption may be particularly acute in historical districts or protected wildlife areas, for example.

An FSO communication system provides an effective and efficient alternative because the communications link can be established simply by deploying the necessary low-powered laser transceivers in or around the buildings (e.g., on rooftops or in windows) or at other sites to be linked. Often, an FSO communication system can be deployed within as little as 24 hours, and no government licensing is typically required. The FSO communications system can carry voice, video, and data signals or combinations thereof at a very high rate. The FSO communications system also can serve as an organization's single link to the Internet, as well as provide for streaming media, video conferencing, and on-line collaboration among organization members dispersed throughout a campus.

One significant drawback of an FSO communications system, however, is its possible vulnerability to atmospheric disturbances. Precipitation, heavy fog, low cloud cover, and even smog are among the various atmospheric disturbances that can impede transmission and receipt of FSO communications systems line-of-sight signals. To date, various providers of FSO communications systems have attempted to compensate for this drawback by relying on radio frequency (RF)/microwave back-up systems for redundancy.

Among various FSO communications systems providers, such as LightPointe, Inc., fSONA Communications Corp., Optical Access, Inc., and Furtera, Inc., many if not most have opted for similar RF back-up system for possible disruptions to an FSO communications system. LightPointe, Inc., for example, recommends complementing an FSO communications system with a microwave radio back-up to provide network redundancy. Furtera, Inc., similarly recommends a hybrid system combining free space optics with RF capabilities.

These RF/microwave redundant systems pose their own problems, however, in terms of increased cost and complexity. The purchase and installation of a separate back-up system offsets the reduced-cost and easy installation provided by the FSO communications system. Moreover, once such an RF/microwave redundant system is installed, it remains idle unless and until there is a disruption in the FSO communication system. Moreover, even if the redundant system remains idle, there nonetheless are costs associated with maintaining the system in working order. Thus, these costs further offset the efficiency advantages of conventional FSO-based communication system.

SUMMARY OF THE INVENTION

In view of the foregoing background, it is therefore an object of the present invention to provide a system and method for carrying communications traffic via an FSO communications system having a more efficient back-up.

This and other objects, features, and advantages in accordance with the present invention are provided by a communications system having a pair of free space optical (FSO) communications terminals with an ad hoc network back-up. Specifically, the FSO communications terminals are positioned in a spaced apart relation to define a dedicated, point-to-point FSO communications link between the terminals over which communications traffic may be carried in a first operating mode, and then an ad hoc network carries communications traffic in a second operating mode when the system switches from the first to the second operating mode. The ad hoc network, more specifically, is a mobile ad hoc network comprising a plurality of spaced apart ad hoc network nodes connected together by a plurality of wireless communication links.

Each FSO communications terminal may include a controller for switching from the first operating mode to the second operating mode in which the communications traffic is carried by the mobile ad hoc network. The terminal may include an ad hoc network node to link the terminal to the ad hoc network. An ad hoc network node may include a communications device, such as an RF or other suitable transceiver, to communicate wirelessly (or over wires) and bi-directionally communicate with other ad hoc network nodes and thus effect the switchover. It may also include an ad hoc network node controller to route communications via the communications device.

The FSO communications terminal may include an FSO transceiver for defining the dedicated, point-to-point FSO communications link with a corresponding remote FSO terminal to carry communications traffic between the two terminals in the first operating mode. The FSO communications terminal controller may also include a quality of service (QoS) monitor to determine at least one QoS parameter, such as a bit error rate. The controller may further include a traffic switcher cooperating with the QoS monitor to switch from the first operating mode to the second operating mode based on the QoS parameter. Typically, the first operating mode will be the primary operating mode, and the second operating mode will define the back-up operating mode. Therefore, the QoS monitor and traffic switcher may cooperate to switch the system from the primary operating mode to the back-up operating mode on the basis of the QoS parameter. Similarly, the system may be switched from the second operating mode to the first operating mode based upon the QoS parameter(s), or the passage of a predetermined period, for example.

The mobile ad hoc network can also carry other communications traffic as well, regardless of the mode in which the system is operating. Routing protocols discover and establish new routes between the ad hoc network nodes on a dynamic basis. Accordingly, the system of the present invention does not require maintaining a largely unused redundant system.

Another aspect of the invention pertains to a method of carrying communications traffic. The method includes positioning the pair of FSO communications terminals in spaced apart relation defining the dedicated, point-to-point FSO communications link over which communications traffic may be carried in a first operating mode. The method may also include providing a mobile ad hoc network, the network comprising a plurality of spaced apart ad hoc network nodes communicating via a plurality of wireless (or wired) communication links. The method may further include switching from the first operating mode to the second operating mode to carry the communications traffic via the mobile ad hoc network. The switching of operating modes may be based upon determining at least one QoS parameter. As such, very little (e.g., one bit) information need be communicated to nodes in the mobile ad-hoc network to indicate an operational mode change.

DETAILED DESCRIPTION OF THE EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
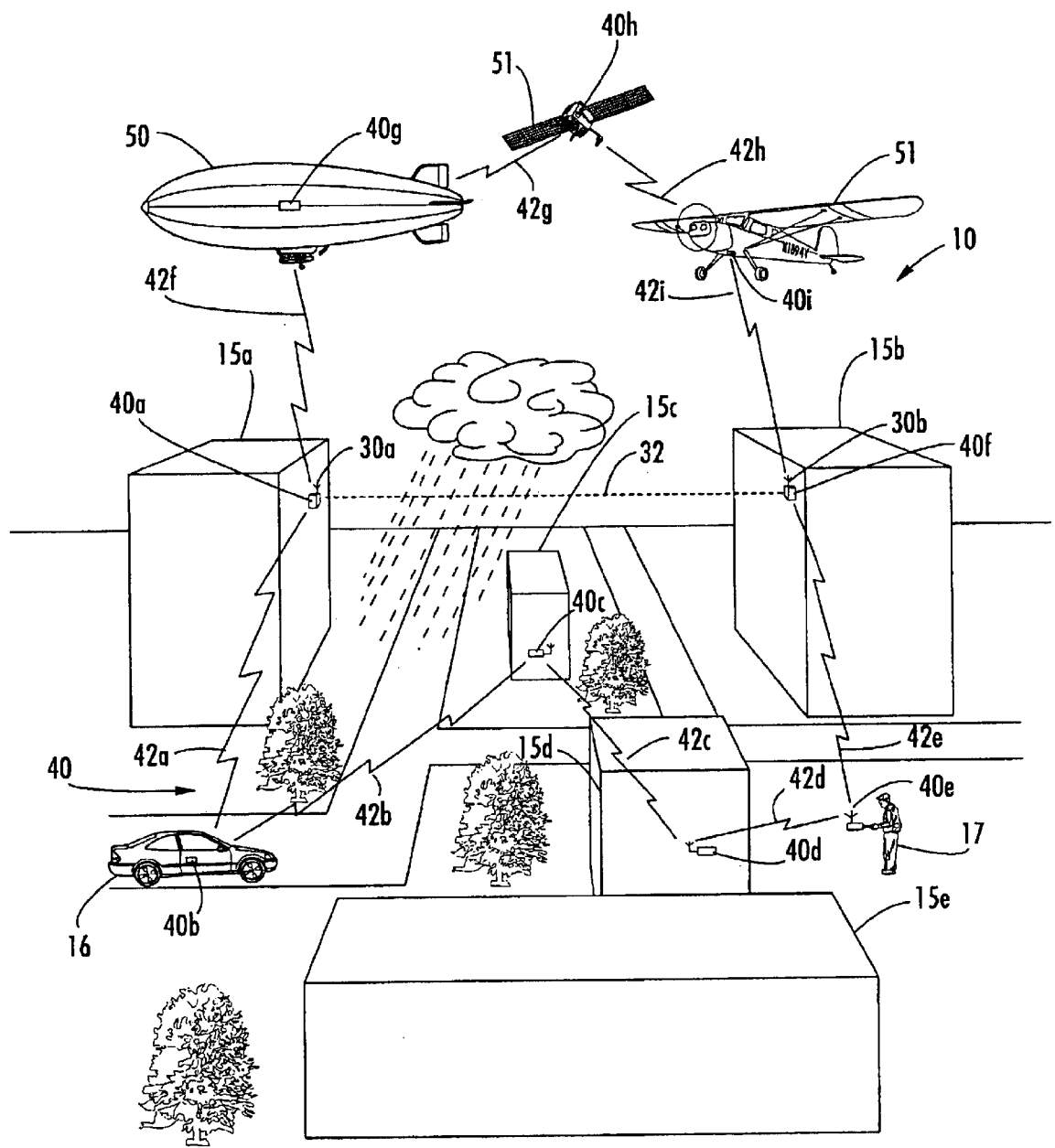
FIG. 1 is a perspective schematic view of a communication system in accordance with the present invention.
Figure 2:
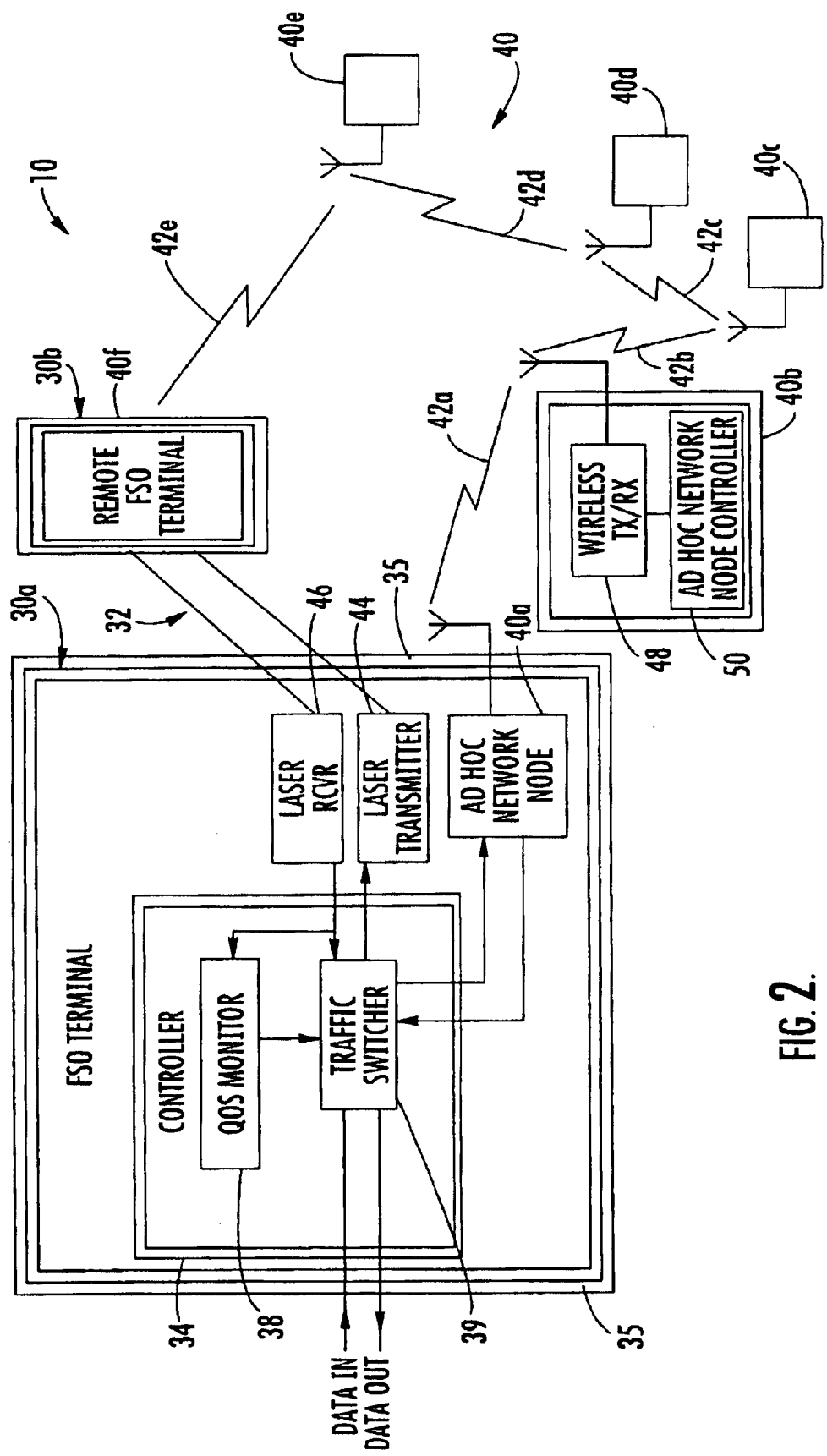
FIG. 2 is a more detailed schematic block diagram of the communications system as shown in FIG. 1.

Referring initially to FIGS. 1 and 2, a communications system 10 according to the invention is first described. The communications system 10 includes a pair of free space optical (FSO) communications terminals 30a, 30b positioned in spaced apart relation to define a dedicated, point-to-point FSO communications link using optical beams 32 for carrying communications traffic in a first operating mode. The system 10 is illustratively installed in a campus environment including a plurality of nearby buildings 15a–15e. A vehicle 16 and pedestrian 17 are also shown in the campus setting. In some embodiments, it will also be appreciated by those of skill in the art that the system 10 may also include mobile platforms that are spacebourne and/or aerial platforms, such as the aerostat 50, satellite 51 and airplane 52 (which may be manned or unmanned) as illustratively shown.

The communications system 10 also illustratively includes a mobile ad hoc network 40 comprising a plurality of spaced apart ad hoc network nodes 40a–40i connected together by a plurality of wireless communication links 42a–42i. Those of skill in the art will appreciate that numerous types of nodes may be used, such as computers and/or personal communicators/communications devices (e.g., personal data assistants (PDAs), laptop computers, cell phones, etc.).

Both of the FSO terminals 30a, 30b are similar or identical. Accordingly, for clarity of explanation, the illustrated left FSO terminal 30a will be described in greater detail. Those of skill in the art will readily appreciate that the illustrated right FSO terminal 30b has similar components and functions. The FSO communications terminal 30a includes a controller 34 for switching from the first operating mode to the second operating mode in which the communications traffic is carried by the mobile ad hoc network 40. Accordingly, the terminal 30a also includes an ad hoc network node 40a to link the terminal to the rest of the ad hoc network 40. It should be noted that while the terminals 30a and 30b are illustratively shown as being located in the buildings 15a and 15b, respectively, these terminals may be located elsewhere in other embodiments, such as on the various platforms noted above, for example.

As shown in greater detail for network node 40b (FIG. 2), each ad hoc network node 40a–40i includes a wireless communications device 48, such as a radio frequency (RF) transceiver, to wirelessly and bi-directionally communicate with other ad hoc network nodes. Each ad hoc network node 40a–40i also includes an ad hoc network node controller 50 to route communications via the wireless communications device 48.

The FSO communications terminal 30a also includes an FSO transceiver, the transceiver comprising a laser transmitter 44 and laser receiver 46. The laser transceiver can, for example, operate centered at the 1550 nm wavelength, this being a common wavelength for FSO equipment. Further, other wavelengths may be multiplexed with the one centered at 1550 nm to create a wavelength division multiplexed composite signal, including those centered at 100 GHz, 50 GHz, 25 GHz, 12.5 GHz, 6.25 GHz, etc., offset from the centered operating wavelength, for example.

The FSO communications terminal controller 34 also illustratively includes a quality of service (QoS) monitor 38 to determine at least one QoS parameter for the dedicated, point-to-point FSO communications link 32. The QoS monitor 38 is illustratively connected to the output of the laser receiver 46. As will be readily appreciated by those skilled in the art, one example of a QoS parameter that may be determined by the QoS monitor 38 is a received bit error rate. As illustratively shown, the controller 34 also includes a traffic switcher 39 cooperating with the QoS monitor 38 to switch from the first operating mode to the second operating mode based on the QoS monitor-determined parameter.

It is typical that the first operating mode will be the primary operating mode. Accordingly, the second operating mode may define a back-up operating mode. Thus, as described, the QoS monitor 38 and traffic switcher 39 may cooperate to switch the system 10 from the primary operating mode to the back-up operating mode on the basis of the QoS parameter.

As will be readily appreciated by those skilled in the art, the mobile ad hoc network 40, when the system is operating in either the first or second operating mode, can carry other communications traffic. An ad hoc network can be defined by a collection of mobile nodes that are dynamically and arbitrarily located in relation to one another, which may include terrestrial, airborne, and/or spacebourne locations. Therefore, interconnections between each of the nodes of the ad hoc network are capable of changing on a continual basis. Routing protocols are available to discover and establish new routes between the nodes on a dynamic basis so that communications traffic may be carried via an efficient route, with rerouting carried out as necessary to avoid interruptions. Examples of such mobile ad hoc networks may be found in U.S. Pat. No. 6,304,556 to Haas and U.S. Pat. No. 5,987,011 to Toh, the entire disclosures of which are incorporated herein by reference.

It follows that the FSO system 10, unlike conventional ones, does not require RF/microwave dedicated, stand-by back-up terminals, for example. Instead, the ad hoc network 40 carries the communications traffic when the route between the pair of FSO communications terminals 30a, 30b is completely blocked or so impeded that traffic cannot be carried as efficiently as it can be over the ad hoc network in the back-up operating mode. The ad hoc network 40, being largely an arbitrary collection of network nodes, provides an already established communications network. Accordingly, there is less likely to be significant cost associated with establishing a redundant or back-up system. If the ad hoc network node 40a is installed within the FSO terminal housing 35, installation may be greatly simplified. It follows, too, that there can be considerably less cost of maintaining such a back-up system.

Moreover, because the ad hoc network 40 is able to carry other communications traffic regardless of whether it is carrying traffic generated by the system 10 and regardless of whether the system is operating in the first or second operating modes (e.g., primary or back-up modes), the cost for maintaining a largely unused redundant RF/microwave back-up system is avoided.

The FSO communications terminals 30a, 30b can operate at a data rate of greater than about 1 Mbps, and, more preferably, in a range of about 2 to 40 Gbps, for example. The FSO communications terminals 30a, 30b, therefore, may operate at a higher communications traffic capacity than the mobile ad hoc network 40. In other words, a reduced bit rate, for example, can be tolerated when in the second or back-up operating mode.

Figure 3:
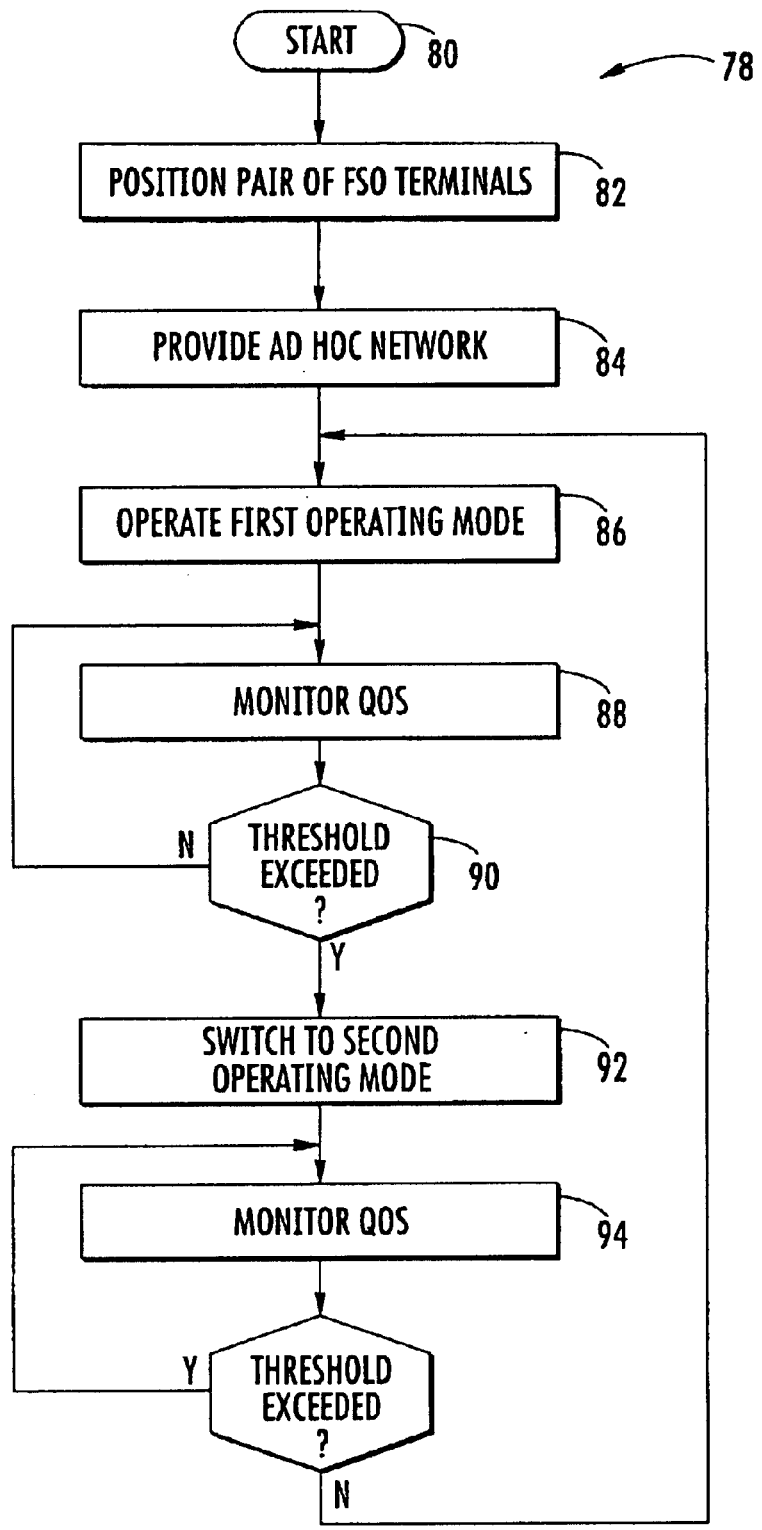
FIG. 3 is a flow chart of a method in accordance with the present invention.

Another aspect of the invention pertains to a method of carrying communications traffic described with reference to the flow chart 78 of FIG. 3. The method, after the start at Block 80, includes positioning a pair of FSO communications terminals 30a, 30b in spaced apart relation to define a dedicated, point-to-point FSO communications link over which communications traffic may be carried in a first operating mode (Block 82). The method also includes, at Block 84, providing a mobile ad hoc network 40, the network comprising a plurality of spaced apart ad hoc network nodes 40a–40h and a plurality of wireless communication links 42a–42h connecting the ad hoc network nodes together.

As illustratively shown, the system may operate in the first operating mode at Block 86, with communications traffic carried over the link between the spaced apart FSO communications terminals 30a, 30b. The QoS monitor 38 monitors one or more QoS parameters (e.g., bit error rate) at Block 88. If the QoS parameter determined by the QoS monitor 38 does not exceed a pre-selected threshold (Block 90), communications is carried out in the first mode. Conversely, if the QoS parameter determined by the monitor is exceeded, the modes are switched, and communications traffic is carried in the second mode (Block 92). With the system 10 operating in the second mode, the QoS parameter continues to be monitored (Block 94) to determine whether and when the operating mode should again be switched to carry communications traffic in the first operating mode. Until then, communications traffic is carried in the second operating mode.

Although not specifically shown in the flow chart 78, the method may further include carrying other communications traffic over the ad hoc network 40. The method may also include the FSO communications terminals operating at a higher communications traffic capacity than that of the mobile ad hoc network.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that other modifications and embodiments are intended to be included within the scope of the appended claims.

That which is claimed is:

1. A communications system comprising:
    a pair of free space optical (FSO) communications terminals positioned in spaced apart relation to define a dedicated, point-to-point FSO communications link therebetween for carrying communications traffic in a first operating mode; and
    a mobile ad hoc network comprising a plurality of spaced apart ad hoc network nodes and a plurality of wireless communication links for connecting the ad hoc network nodes together;
    each FSO communications terminal comprising a controller for switching from the first operating mode to a second operating mode wherein the communications traffic is carried by said mobile ad hoc network.

2. A communications system according to claim 1 wherein said controller comprises a quality of service (QoS) monitor for determining at least one QoS parameter for the dedicated, point-to-point FSO communications link.

3. A communications system according to claim 2 wherein said controller further comprises a traffic switcher cooperating with said QoS monitor for switching from the first operating mode to the second operating mode based upon the at least one QoS parameter.

4. A communications system according to claim 3 wherein said controller switches from the second operating mode to the first operating mode based upon the at least one QoS parameter.

5. A communications system according to claim 2 wherein the at least one QoS parameter comprises a bit error rate.

6. A communications system according to claim 1 said mobile ad hoc network also carries other communications traffic.

7. A communications system according to claim 1 wherein the first operating mode defines a primary operating mode; and wherein the second operating mode defines a back-up operating mode.

8. A communications system according to claim 1 wherein each FSO communications terminal further comprises a respective ad hoc network node of said ad hoc network connected to said controller.

9. A communications system according to claim 1 wherein each ad hoc network node comprises a radio frequency (RF) communications device to wirelessly and bi-directionally communicate with other ad hoc network nodes, and an ad hoc network node controller to route communications via the RF communications device.

10. A communications system according to claim 1 wherein said pair of FSO communications terminals operate at a higher communications traffic capacity than said mobile ad hoc network.

11. A communications system according to claim 1 wherein said pair of FSO communications terminals operate at a data rate in a range of greater than about 1 Mbps.

12. A communications system according to claim 1 wherein each FSO communications terminal further comprises a laser transmitter and a laser receiver connected to said controller.

13. A communications system according to claim 12 wherein said laser transmitter operates at about a 1550 nm wavelength.

14. A communications system according to claim 1 wherein said FSO communications terminals transmit wavelength division multilevel signals therebetween via the FSO communications link.

15. A communications system comprising:
  a pair of free space optical (FSO) communications terminals positioned in spaced apart relation to define a dedicated, point-to-point FSO communications link therebetween for carrying communications traffic in a primary operating mode; and
  a mobile ad hoc network;
  each FSO communications terminal comprising a controller comprising a quality of service (QoS) monitor and a traffic switcher cooperating therewith for switching between the primary operating mode and a back-up operating mode wherein the communications traffic is carried by said mobile ad hoc network based upon at least one QoS parameter.

16. A communications system according to claim 14 wherein the at least one QoS parameter comprises a bit error rate.

17. A communications system according to claim 14 said mobile ad hoc network also carries other communications traffic.

18. A communications system according to claim 14 wherein said ad hoc network comprises a plurality of spaced apart ad hoc network nodes and a plurality of wireless communication links for connecting the ad hoc network nodes together.

19. A communications system according to claim 17 wherein each FSO communications terminal further comprises a respective ad hoc network node of said ad hoc network connected to said controller.

20. A communications system according to claim 17 wherein each ad hoc network node comprises a radio frequency (RF) communications device to wirelessly and bi-directionally communicate with other ad hoc network nodes, and an ad hoc network node controller to route communications via the RF communications device.

21. A communications system according to claim 14 wherein each FSO communications terminal further comprises a laser transmitter and a laser receiver connected to said controller.

22. A communications system according to claim 14 wherein said pair of FSO communications terminals operate at a higher communications traffic capacity than said mobile ad hoc network.

23. A free space optical (FSO) communications terminal for communicating with a remote FSO communications terminal, the FSO communications terminal comprising:
  an FSO transceiver for defining a dedicated, point-to-point FSO communications link with the remote FSO terminal for carrying communications traffic therebetween in a first operating mode;
  an ad hoc network node for an ad hoc network comprising a plurality of spaced apart ad hoc network nodes and a plurality of wireless communication links for connecting the ad hoc network nodes together; and
  a controller for switching from the first operating mode to a second operating mode wherein the communications traffic is carried by the ad hoc network node.

24. An FSO communications terminal according to claim 22 wherein said controller comprises a quality of service (QoS) monitor for determining at least one QoS parameter for the dedicated, point-to-point FSO communications link.

25. An FSO communications terminal according to claim 23 wherein said controller further comprises a traffic switcher cooperating with said QoS monitor for switching from the first operating mode to the second operating mode based upon the at least one QoS parameter.

26. An FSO communications terminal according to claim 24 wherein said controller switches from the second operating mode to the first operating mode based upon the at least one QoS parameter.

27. An FSO communications terminal according to claim 23 wherein the at least one QoS parameter comprises a bit error rate.

28. An FSO communications terminal according to claim 22 wherein the first operating mode defines a primary operating mode; and wherein the second operating mode defines a back-up operating mode.

29. An FSO communications terminal according to claim 22 wherein said ad hoc network node comprises a radio frequency (RF) communications device to wirelessly and bi-directionally communicate with other ad hoc network nodes, and an ad hoc network node controller to route communications via the RF communications device.

30. An FSO communications terminal according to claim 22 wherein FSO transceiver operates at a higher communications traffic capacity than said ad hoc network node.

31. A method of carrying communications traffic comprising:
  positioning a pair of free space optical (FSO) communications terminals in spaced apart relation to define a dedicated, point-to-point FSO communications link therebetween for carrying the communications traffic in a first operating mode;
  providing a mobile ad hoc network comprising a plurality of spaced apart ad hoc network nodes and a plurality of wireless communication links for connecting the ad hoc network nodes together; and
  switching from the first operating mode to a second operating mode wherein the communications traffic is carried by the mobile ad hoc network.

32. A method according to claim 30 further comprising determining at least one QoS parameter for the dedicated, point-to-point FSO communications link.

33. A method according to claim 31 wherein switching comprises switching based upon the at least one QoS parameter.

34. A method according to claim 32 further comprising switching from the second operating mode to the first operating mode based upon the at least one QoS parameter.

35. A method according to claim 31 wherein the at least one QoS parameter comprises a bit error rate.

36. A method according to claim 30 wherein mobile ad hoc network also carries other communications traffic.

37. A method according to claim 30 wherein the first operating mode defines a primary operating mode; and wherein the second operating mode defines a back-up operating mode.

38. A method according to claim 30 wherein said pair of FSO communications terminals operate at a higher communications traffic capacity than said mobile ad hoc network.

* * * * *